US008579712B2

(12) United States Patent
Tedsen et al.

(10) Patent No.: US 8,579,712 B2
(45) Date of Patent: Nov. 12, 2013

(54) CONTROLLED ACCESS OF SECURE AREA WITHIN A GAMING MACHINE USING DISPLAY

(75) Inventors: Kirk A. Tedsen, Reno, NV (US); Kehl T. LeSourd, Reno, NV (US); Jeffrey F. Macedo, Sparks, NV (US); Steve McGahn, Reno, NV (US)

(73) Assignee: IGT, Reno, NV (US)

( * ) Notice: Subject to any disclaimer, the term of this patent is extended or adjusted under 35 U.S.C. 154(b) by 1487 days.

(21) Appl. No.: 11/595,660

(22) Filed: Nov. 10, 2006

(65) Prior Publication Data

US 2008/0113820 A1 May 15, 2008

(51) Int. Cl.
*A63F 13/08* (2006.01)

(52) U.S. Cl.
USPC .......... 463/46

(58) Field of Classification Search
USPC .......... 463/46; 312/270.2, 293.2, 323
See application file for complete search history.

(56) References Cited

U.S. PATENT DOCUMENTS

| | | | | |
|---|---|---|---|---|
| 3,711,894 | A * | 1/1973 | Walters | 16/325 |
| 5,239,776 | A * | 8/1993 | Lhotak | 49/199 |
| 5,381,315 | A * | 1/1995 | Hamaguchi et al. | 361/727 |
| 5,813,914 | A * | 9/1998 | McKay et al. | 463/46 |
| 6,061,104 | A | 5/2000 | Evanicky et al. | |
| 6,164,645 | A | 12/2000 | Weiss | |
| 6,186,606 | B1 * | 2/2001 | Krei | 312/221 |
| 6,353,532 | B1 * | 3/2002 | Landrum et al. | 312/223.2 |
| 7,351,153 | B2 * | 4/2008 | Nagano | 463/46 |
| 2004/0061284 | A1 | 4/2004 | Satoh | |
| 2005/0026702 | A1 * | 2/2005 | Cole | 463/46 |
| 2005/0059496 | A1 | 3/2005 | Hanchar | |
| 2005/0077995 | A1 * | 4/2005 | Paulsen et al. | 340/5.6 |
| 2005/0277477 | A1 | 12/2005 | Hajder et al. | |
| 2006/0125358 | A1 | 6/2006 | Williamson | |
| 2006/0154732 | A1 * | 7/2006 | Tastad | 463/46 |
| 2007/0238531 | A1 * | 10/2007 | Taxon | 463/46 |

FOREIGN PATENT DOCUMENTS

| | | |
|---|---|---|
| EP | 0897167 | 2/1999 |
| EP | 1262928 | 12/2002 |
| WO | WO2008/082798 A2 | 7/2008 |

OTHER PUBLICATIONS

International Search Report mailed Aug. 11, 2008 from Appln. No. PCT/US2007/084116, including Notification of Transmittal, and Written Opinion of the International Searching Authority mailed Aug. 11, 2008 from Appln. No. PCT/US2007/084116. 13 pages.

International Preliminary Report on Patentability and Written Opinion of the International Searching Authority dated May 12, 2009 issued in PCT/US2007/084116. 5 pages.

* cited by examiner

*Primary Examiner* — Werner Garner
(74) *Attorney, Agent, or Firm* — Foley & Lardner LLP

(57) ABSTRACT

A gaming machine having a cabinet having an interior portion, the interior portion having a front section and a back section, a gaming machine door coupled to the cabinet, a display positioned between the gaming machine door and the interior portion to display a game of chance, the display having a top, a bottom, a first side, and a second side, a connection assembly to couple the display to the gaming machine, and at least one lock coupled to the connection assembly to releasably lock the display in a closed position to prevent unauthorized access to the interior portion, the interior portion having at least one of a cash box, a coin hopper, a printer, or a paper holder, wherein the display is configured to be moved when the at least one lock is in an unlocked position to provide access to the interior portion.

9 Claims, 15 Drawing Sheets

CONTROLLED ACCESS OF SECURE AREA WITHIN A GAMING MACHINE USING DISPLAY

FIELD OF THE INVENTION

The present invention relates to controlled access to a gaming machine. More specifically, the present invention relates to controlled access to a secure area within a gaming machine using the gaming machine display.

BACKGROUND OF THE INVENTION

Security continues to be an issue within the gaming industry. With the use of liquid crystal displays (LCDs) in gaming machines, additional space created within the gaming machine cabinet is used for various gaming operational devices. Devices such as a bill acceptor, cash box, printer, and paper holder may be disposed within the gaming machine cabinet. As additional devices are positioned within the cabinet, technicians that did not previously have access to the cabinet would now need to access the cabinet to service and maintain the additional gaming operational devices.

Thus, security to limit access to sensitive areas of the gaming machine is important. It would be preferable that technicians needing access to retrieve the cash box or refill the printer paper did not have access to sensitive areas of the gaming machine, such as network connections, master gaming controller, and other similar devices for security purposes.

BRIEF DESCRIPTION OF THE INVENTION

The invention provides for various embodiments to control access of a secure area within a gaming machine using the gaming machine display. The gaming machine may have a cabinet having an interior portion and a top surface, a gaming machine door coupled to the cabinet, and a display rotatably coupled to the cabinet between the gaming machine door and the interior portion, the display configured to rotate about an axis to allow access to the interior portion.

In another embodiment, the gaming machine may have a cabinet having an interior portion, a gaming machine door coupled to the cabinet, a display positioned between the gaming machine door and the interior portion to display a game of chance, the display having a top, a bottom, a first side, and a second side, a first connector rail having a first end coupled to the first side of the display and a second end coupled to a first side of the interior portion, a second connector rail having a first end coupled to the second side of the display and a second end coupled to a second side of the interior portion, and at least one coupler having a first end coupled to the top of the display and a second end coupled to a top surface of the cabinet, wherein the display is configured to slide along the first connector rail and the second connector rail to rotate upward when the at least one coupler is retracted to expose the interior portion.

In a further embodiment, the gaming machine may have a cabinet having an interior portion, a gaming machine door coupled to the cabinet, a display coupled to the cabinet between the gaming machine door and the interior portion to display a game of chance, the display having a top, a bottom, a first side, and a second side, at least one releasable latch coupled to the display top to releasably connect the display to the cabinet, a support bar coupled to a front of the cabinet to receive the display bottom, at least one connector coupled to the display bottom and the support bar to movably connect the display to the cabinet, and at least one coupler having a first end coupled to the display top and a second end coupled to the interior portion configured to rotate the display downward about an axis of the at least one connector when the at least one releasable latch is in a released position to provide access to the interior portion, wherein the at least one releasable latch is configured to release the display from the cabinet when the gaming machine door is in an open position.

In yet another embodiment, the gaming machine may have a cabinet having an interior portion, a gaming machine door coupled to the cabinet, a display coupled to the cabinet between the gaming machine door and the interior portion to display a game of chance, the display having a top, a bottom, a first side, and a second side, means for vertically sliding the display to partially expose the interior portion, and means for rotating the display outside the cabinet at a predetermined position, wherein the display is parallel to a side of the cabinet to expose the interior portion.

In still another embodiment, the gaming machine may have a cabinet having an interior portion, the interior portion having a front section and a back section, a gaming machine door coupled to the cabinet, a display positioned between the gaming machine door and the interior portion to display a game of chance, the display having a top, a bottom, a first side, and a second side, a connection assembly to couple the display to the gaming machine, and at least one lock coupled to the connection assembly to releasably lock the display in a closed position to prevent unauthorized access to the interior portion, the interior portion having at least one of a cash box, a coin hopper, a printer, or a paper holder, wherein the display is configured to be moved when the at least one lock is in an unlocked position to provide access to the interior portion.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Embodiments are described herein in the context of a controlled access of a secure area within a gaming machine using the display. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
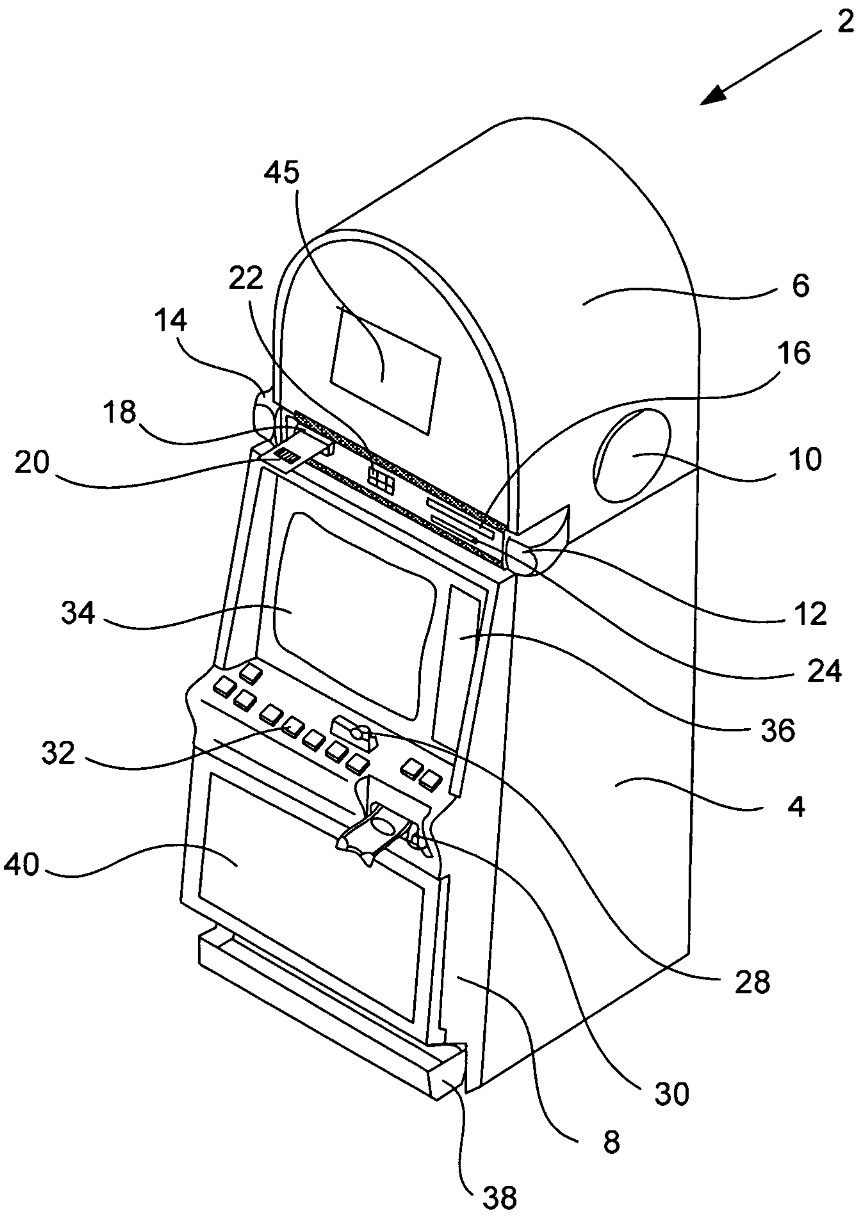
FIG. 1 illustrates an embodiment of a gaming machine.

Embodiments to control access of secure areas within a gaming machine using the gaming machine display are provided. The display 34 in each embodiment may be coupled to the cabinet 4 and not the main door 8 as is commonly designed in current gaming machines. FIG. 1 illustrates an embodiment of a gaming machine. Gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. Although illustrated as attached to the main door, the player-input switches or buttons 32 may also be attached to the gaming machine cabinet itself and not to the main door. The display monitor 34 will typically be a cathode ray tube, high resolution flat-panel LCD, or other conventional electronically controlled video monitor. The information panel 36 may be a backlit, silk-screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of pay lines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices than shown in FIG. 1. For example, the top box may contain a bonus wheel or a backlit silk-screened panel that may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

The gaming machines may have various components that a casino may want to control access thereto. Once the main door 8 is opened, there may be tiered access to various components within the cabinet 4. For exemplary purposes only and not intended to be limiting, a low security access area would allow a casino service person to access devices such as the power switch and to view the meters. A medium access area would allow the casino service person to access at least one of a coin hopper, cash box, paper holder, coin acceptor, or a printer. A high security access area may allow the casino service person to access devices such as the bill validator 30, network connections, or master gaming controller.

When a user wishes to play the gaming machine 2, he or she inserts cash through the coin acceptor 28 or bill validator 30. Additionally, the bill validator may accept a printed ticket voucher that may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input device.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2:
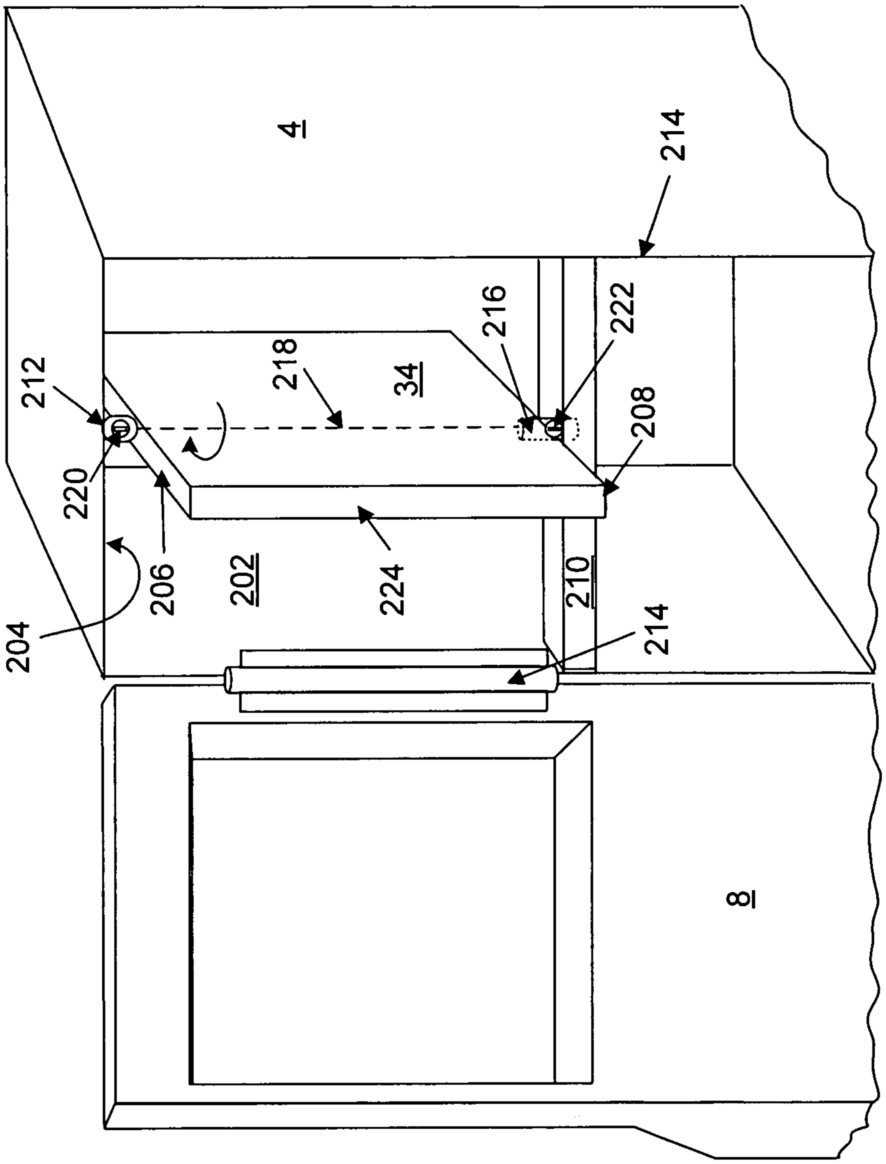
FIG. 2 illustrates an embodiment to control access to a gaming machine cabinet.

FIG. 2 illustrates an embodiment to control access to a gaming machine cabinet. The main door 8 on the cabinet 4 may be opened to expose the display 34. Although embodiments herein are described with the display 34 coupled to the body of the gaming machine cabinet 4, the embodiments may also be used with other displays positioned elsewhere on the gaming machine such as on the top box. Pivoting the display 34 about a centerline axis 218, may expose the cabinet interior 202. The display 34 may have a top 206 coupled to the cabinet top surface 204 or a top support bar (as illustrated in FIG. 5C) and a bottom 208 coupled to a support bar 210. The support bar 210 may be coupled to the cabinet sides 214.

The display 34 may be pivotally coupled to the cabinet 4 by any means, such as the use of rods as pivot bars. For exemplary purposes only and not intended to be limiting, a first pivot bar 212 may be coupled to the display top 206 and the cabinet top surface 204. A second pivot bar 216 may be coupled to the display bottom 208 and the support bar 210. The second pivot bar 216 may be positioned opposite the first pivot bar 212. The first pivot bar 212 and the second pivot bar 216 may be positioned anywhere on the display 34, however, to effectively use the display as a way to control access to the cabinet 4, the first pivot bar 212 and the second pivot bar 216 may be positioned along the center line 218 of the display 34.

To lock the display 34 to control access to the cabinet interior 202, a first lock 220 may be coupled to the first pivot bar to prevent movement of the first pivot bar 212 and display 34. For additional security, a second lock 222 may be coupled to the second pivot bar 216 to prevent rotation of the second pivot bar 216 and the display 34. The first lock 220 and second lock 222 may be any type of lock such as a key-actuated lock or a combination lock. Thus, the display 34 is thereby used as a shield to prevent access to the cabinet interior 202.

To gain access to the cabinet interior 202, a user must unlock the first lock 220 and second lock 222. The display 34 may then be rotated about an axis of the first pivot bar 212 and the second pivot bar 216 to access to the cabinet interior 202. Although illustrated as being rotated about the vertical axis in FIG. 2, the display 34 may also be rotated about the horizontal axis. The pivot bars may be positioned on the sides 214 of the cabinet 4 and coupled to the sides 224 of the display 34.

Figure 3A:
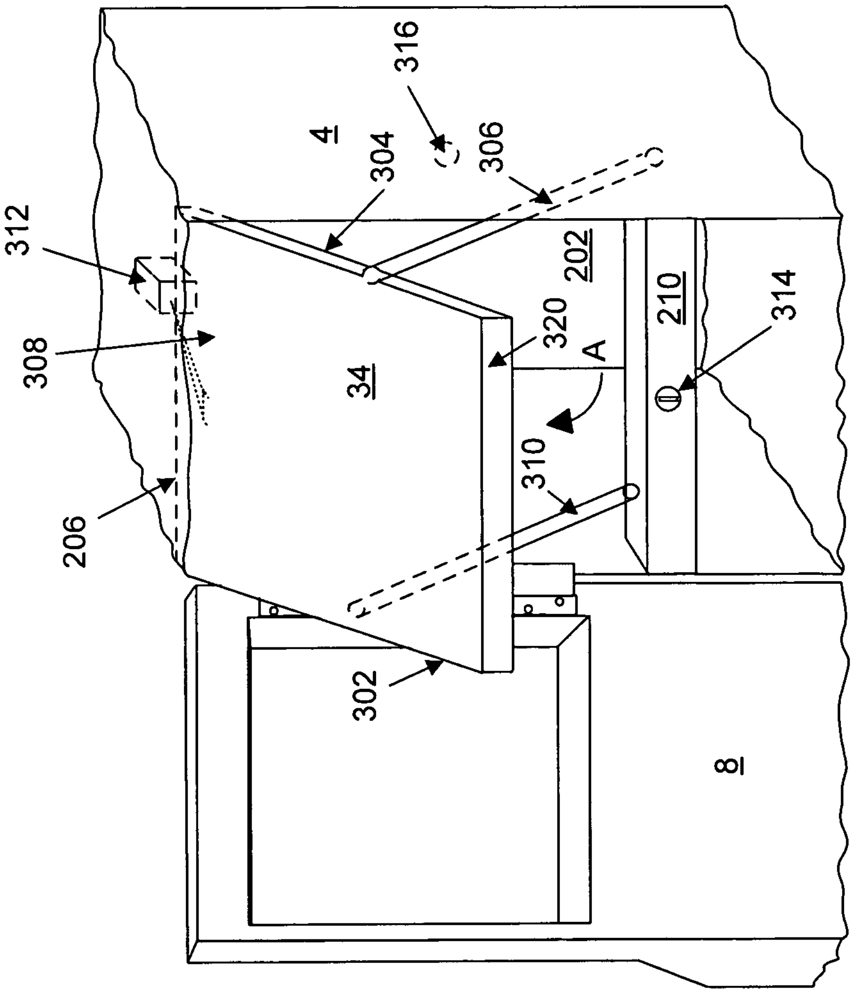
FIGS. 3A and 3B illustrate another embodiment to control access to a gaming machine cabinet.
Figure 3B:
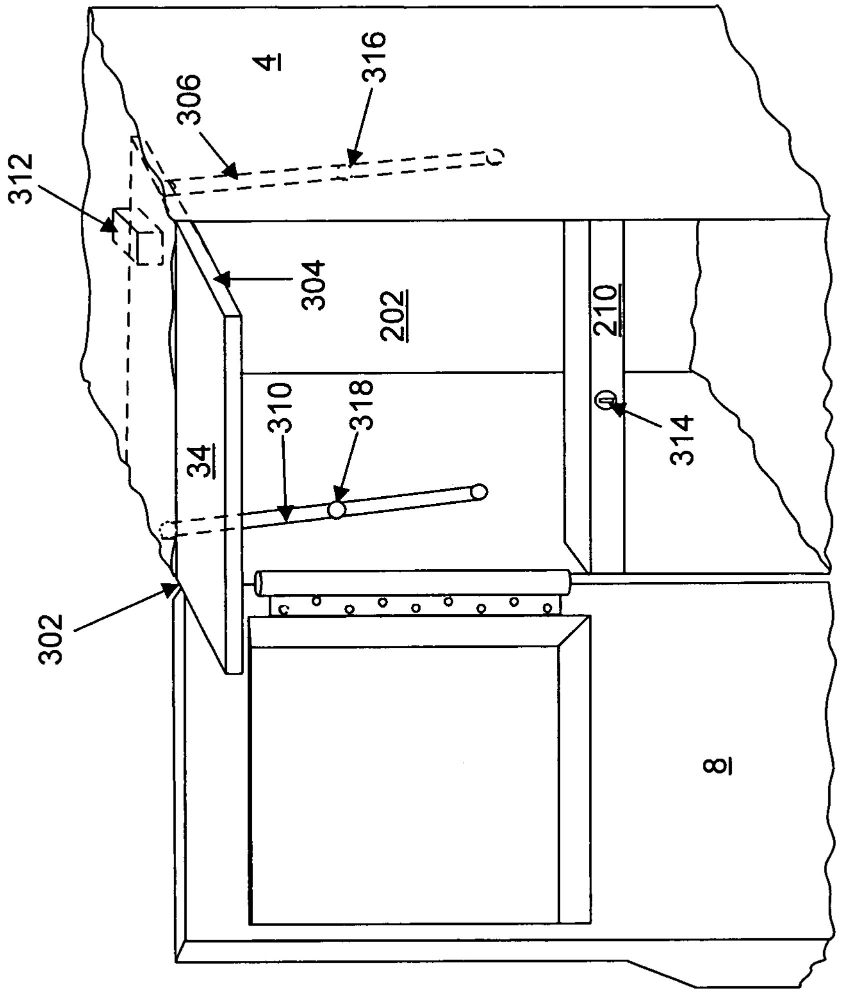

FIGS. 3A and 3B illustrate another embodiment to control access to a gaming machine cabinet. A first connector 306 may be used to connect a first side 304 of the display to the cabinet interior 202. A second connector 310 may be used to connect a second side 302 of the display to the cabinet interior 202. The first and second connectors 306, 310 may be any type of connector that will allow the display 34 to rotate upward, as illustrated by arrow A, into the cabinet interior 202, such as a railing. A third connector 308 may be used to connect the top 310 of the display 34 to the rear of the cabinet interior 202 to assist and support the display 34 when raised. The third connector 308 may have a motor 312 to retract and extend the third connector 308. The third connector 308 and motor 312 may be coupled to any sides of the cabinet interior 202, such as the back side as illustrated in FIG. 3A and 3B. However, the third connector 308 and motor 312 may also be coupled to the top surface 204 of the cabinet interior 202. A switch may be in communication with the motor 312 to retract or extend the third connector 308. The third connector 308 may be any type of connector that will assist and support the display 34 when lowered to an open position or raised to a closed position, such as a cable. The switch 314 may be positioned on the support bar 210 that supports the base 320 of the display 34 or any other accessible location in the cabinet 4.

In use, the display 34 may be manually raised and rotated upward if no motor was coupled to the third connector 308. In another embodiment, the switch 314 may be used to activate the motor 312 to retract or extend the third connector 308. The switch 314 may be configured to activate the motor 312 when the gaming machine door 8 is in an open position as illustrated in FIGS. 3A and 3B. As the third connector 308 is retracted, it raises the display 34 in the direction of arrow A. As the display 34 is raised, it is supported by and slides along the first connector 306 and the second connector 310. The interior of the cabinet 202 may then be accessed once the display 34 is raised in an open position as illustrated in FIG. 3B.

To lock the display 34 to control access to the cabinet interior 202 or secure the display 24 in the open position, a first lock 316 may be coupled to the first connector 306 to prevent upward rotation of the display 34 and unauthorized access to the interior portion 202. Access to the first lock 316 may be from the exterior of the gaming machine. For further security, a second lock 318 may be coupled to the second connector 318 to prevent upward rotation of the display 34 or secure the display 34 in the open position. The first lock 316 and second lock 318 may be any type of lock such as a key-actuated lock or a combination lock. In another embodiment, the switch 314 may also be used as a lock to prevent rotation of the display 34. A user may be required to activate the switch 314 with a key or access code to start the upward rotation of the display 34. To return the display 34 to its closed position, the user may activate the switch 314 to cause the motor to release the third connector to downwardly rotate the display 34 to a closed position. Alternatively, the user may manually lower the display 34 to its closed position if no motor 312 is coupled to the third connector 308.

FIGS. 4A-4D illustrate yet another embodiment to control access to a gaming machine cabinet. A connector 406 may be used to connect the display 34 to the cabinet 4. The connector 406 may be coupled to the display top 206 and the interior of the cabinet 202. The connector 406 may be any type of connector to lower and raise the display 34, such as a cable. The connector 406 may be coupled to a motor 402 to retract and extend the connector 406 to controllably lower and raise the display 34. The motor 402 may be in communication with a switch 410 to activate the motor to extend or retract the connector 406.

Figure 4A:
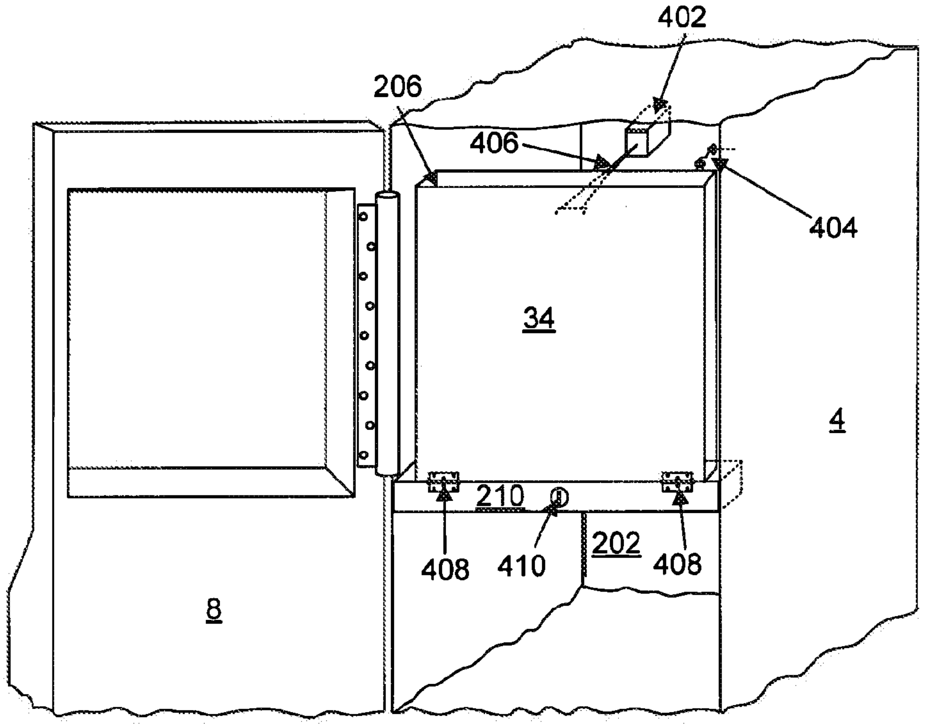
FIGS. 4A-4D illustrate yet another embodiment to control access to a gaming machine cabinet.
Figure 4B:
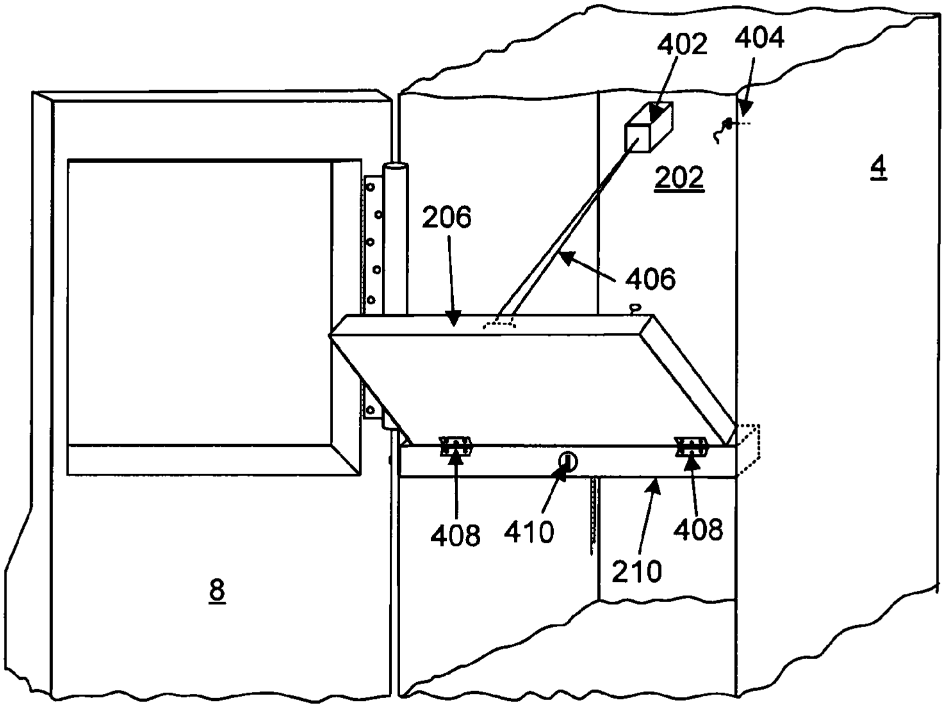
Figure 4C:
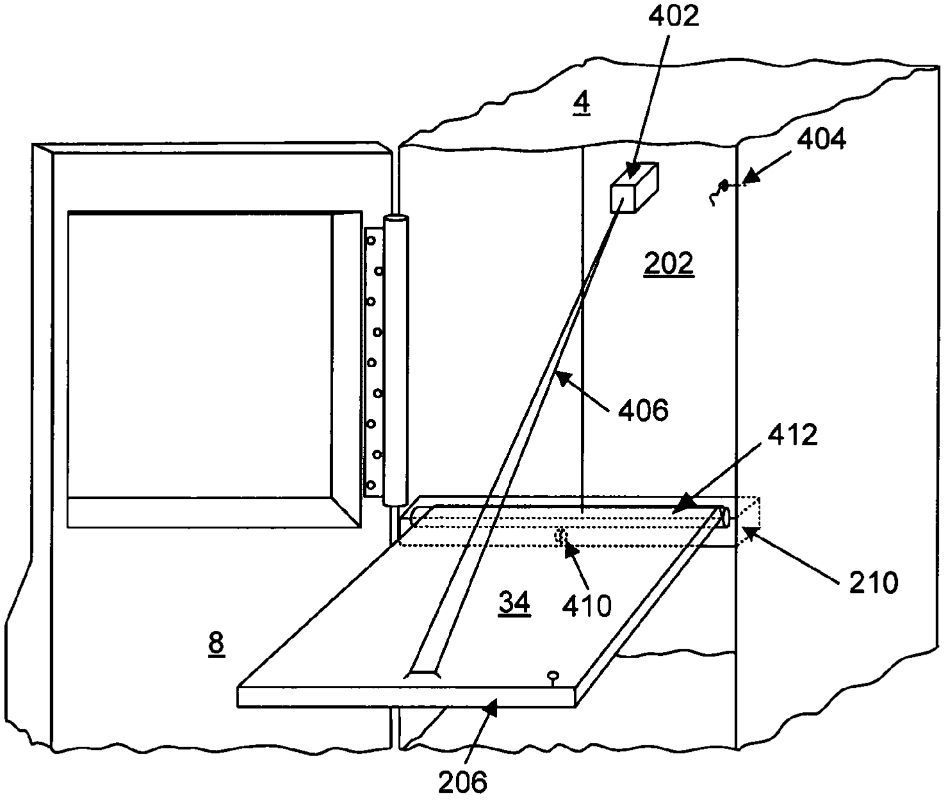

The display 34 may be supported by support bar 210. Hinges 408 may be used to connect the display 34 to the support bar 210. Although illustrated with two hinges 408, the number of hinges is not intended to be limiting as any number of hinges 408 may be used. Additionally, although described with the use of hinges 408, the display may be coupled to the support bar by any other means that allows the display to rotate downward, such as with a rod 412 as illustrated in FIGS. 4C and 4D.

In use, when the main door 8 is opened, a switch may automatically activate the motor 402 to extend connector 406. The connector 406 may then controllably lower the display 34 downward to an open position to expose and allow access to the cabinet interior 202 as illustrated in FIG. 4C. The connector 406 may also be retracted to rotate the display 34 upward to a closed position as illustrated in FIG. 4A. To lock the display 34 to control access to the cabinet interior 202, in one embodiment, a key or code may be required to activate the motor 402. In another embodiment, at least one latch 404 may be coupled to the cabinet 4 to secure the display 34 to the cabinet 4. The latch 404 may be positioned in the cabinet interior 202 such as on the side as illustrated in FIGS. 4A-D. The latch 404 may be any type of latch able to secure the display 34 to the cabinet 4 such as a hook or a plunger. The latch 404 may automatically release the display 34 when the door 8 is opened or a user may use a key or code to unlock the latch 404.

Figure 4D:
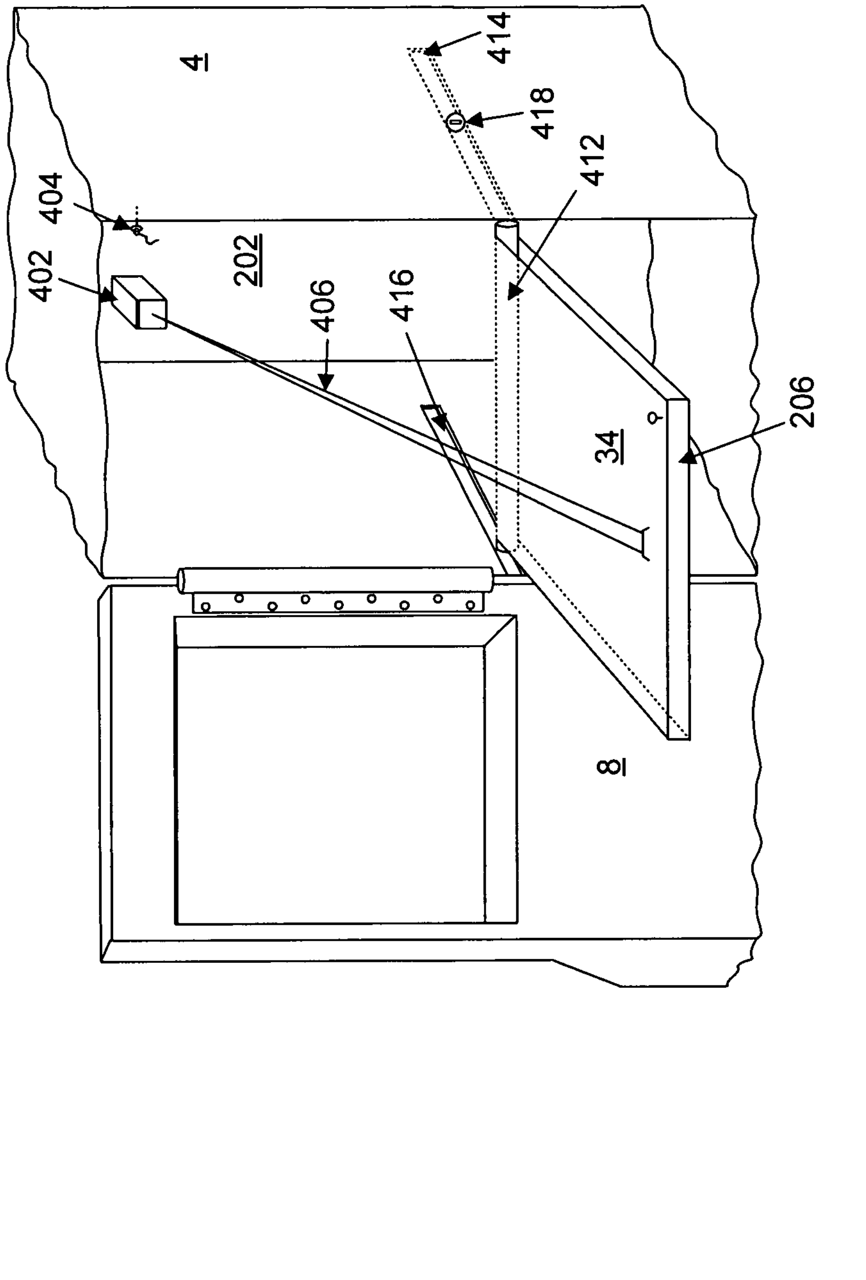

Referring now to FIG. 4D, once the display 34 is lowered, the display 34 may slide into the cabinet interior 202 to control access to a lower portion of the gaming machine. The display may be slid into the cabinet interior 202 by any means. For exemplary purposes only and not intended to be limiting, a first rail 414 and a second rail 416 may be coupled to the cabinet interior 202 and designed to allow the rod 412 to slide into. For additional security, a lock 418 may be placed on the first rail 414, second rail 416, or both to prevent the display 34 from being slid out of the cabinet interior 202.

Figure 5A:
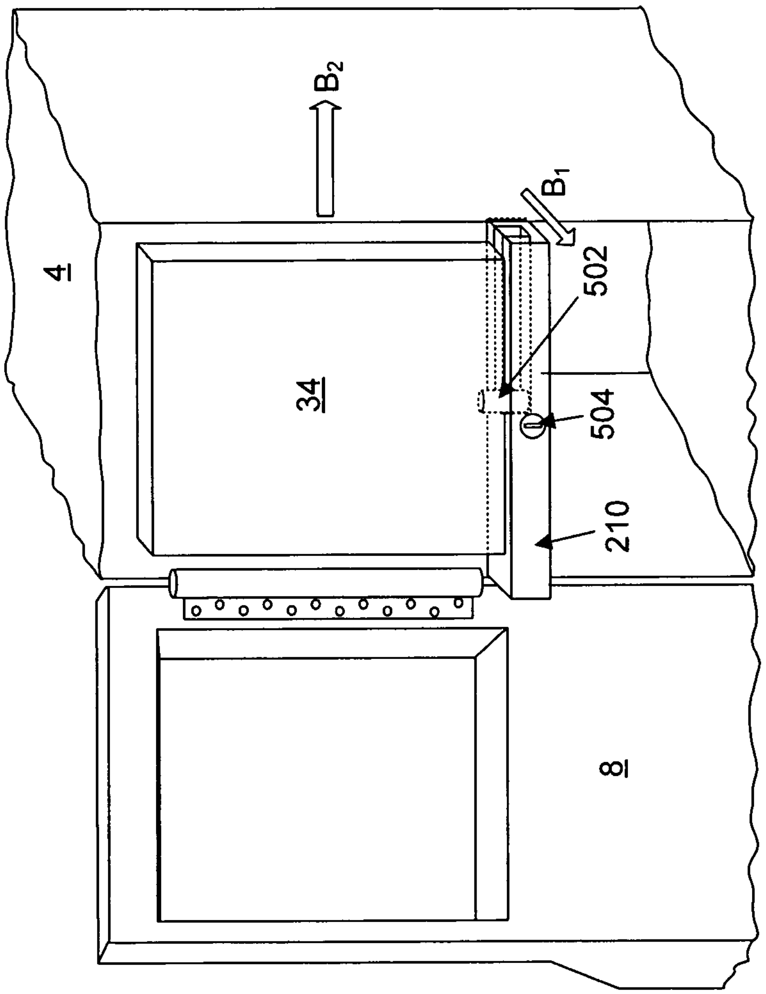
FIGS. 5A-5D illustrate still another embodiment to control access to a gaming machine cabinet.
Figure 5B:
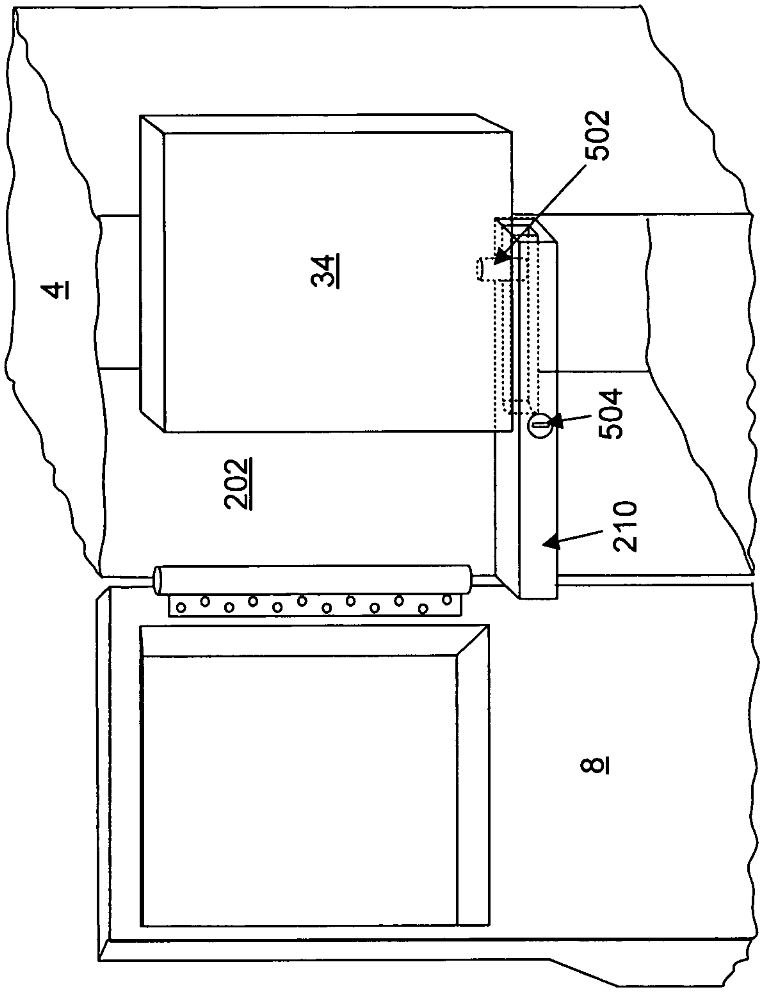
Figure 5C:
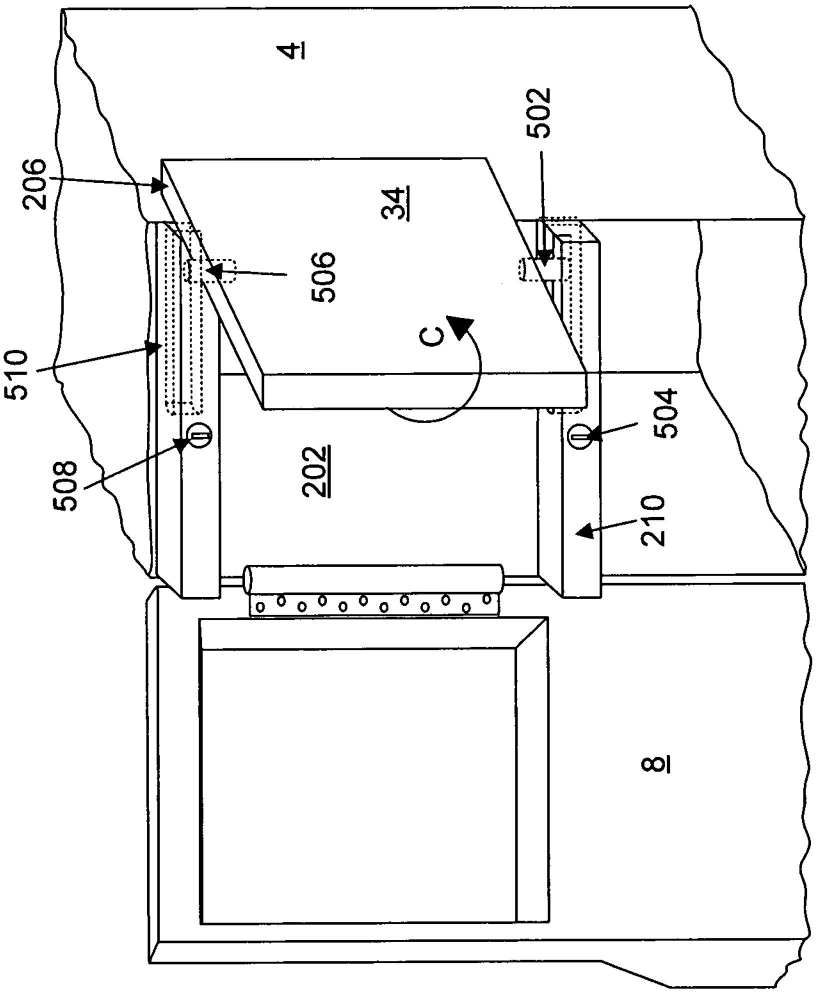

FIGS. 5A-5D illustrate still another embodiment to control access to a gaming machine cabinet. Referring now to FIG. 5A, from a closed position, the display 34 may be slideably supported by support bracket 210 and pivotally coupled to the support bracket 210 by any means, such as the use of a rod as a pivot bar 502. In use, the support bar 210 may be slidably movable outward in the direction of arrow $B_1$. A guide rail or any other device may be coupled to the support bracket 210 that will allow the display 34 to slide in the direction of arrow $B_2$ thereby exposing a portion of the cabinet interior 202 as illustrated in FIG. 5B.

Figure 5D:
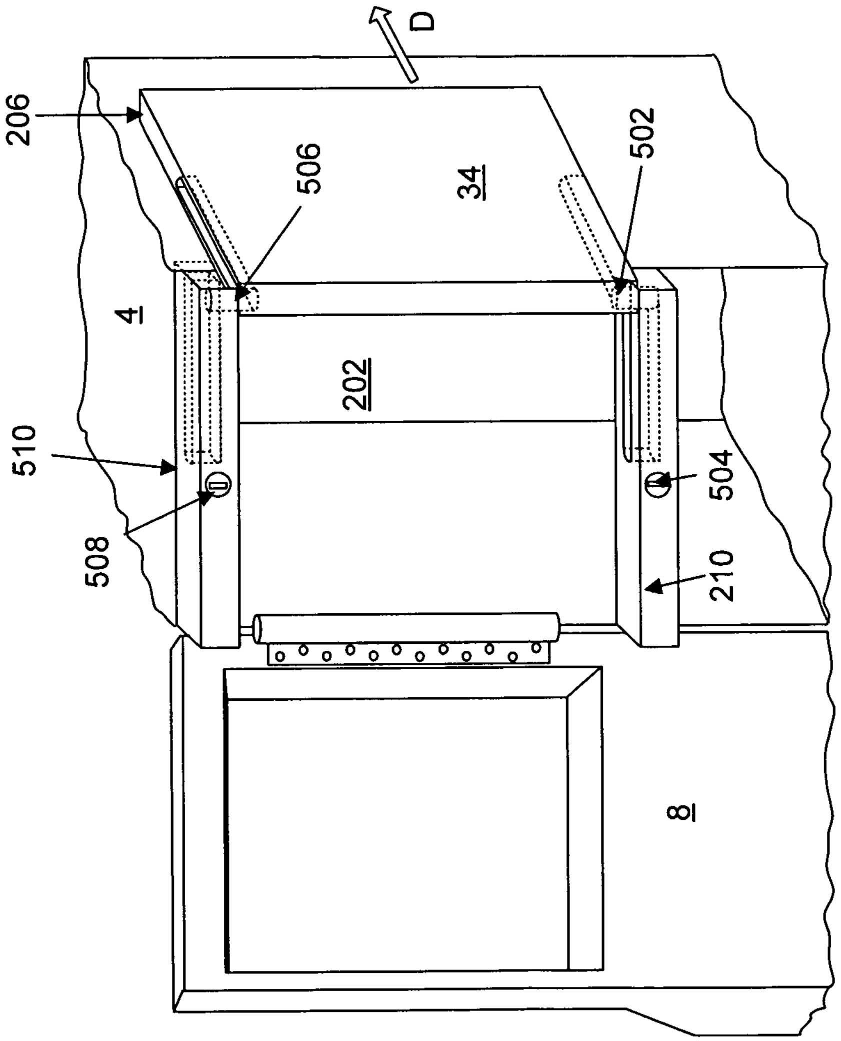

At a predetermined position, the display 34 may no longer slide along support bar 210. The predetermined position may be any position set by the user such as at a centerline of the display 34 as illustrated in FIG. 5B. At the predetermined position, the display 34 may be rotated about an axis of the first pivot bar 502 in the direction of arrow C, as illustrated in FIG. 5C, to the exterior of the cabinet 4 in an open position. This exposes and provides access to the cabinet interior 202. The display 34 may then be moved in the direction of arrow D as illustrated in FIG. 5D so that the display 34 may be moved out of the way for easy access to the cabinet interior 202.

As illustrated in FIG. 5C, in another embodiment, a top support bracket 510 may be used to support the display top 206 and may be slidably movable to slide out of the cabinet interior 202. A second pivot bar 506 may be used to couple the display top 206 to the top support bracket 510 and allow the display to slide and rotate on the top support bracket 510 as described above with reference to the support bracket 210. The second pivot bar 506 may also provide additional support when the display 34 is positioned at the exterior side of the cabinet 4.

To lock the display 34 to the cabinet, a first lock 504 may be positioned on the support bar 210 to lock the pivot bar 502 in place to prevent the display from sliding along the support bar 210. When used with the top support bracket 510, a second lock 508 may be used to lock the second pivot bar 506 in place to prevent the display from sliding along the top support bar 510. In another embodiment, the first and second lock 504, 508 may be a separate latch coupled to the display rather than to the pivot bar 502, 506 to prevent movement of the display 34. The latch may be any known latch such as a hook or plunger.

Figure 6A:
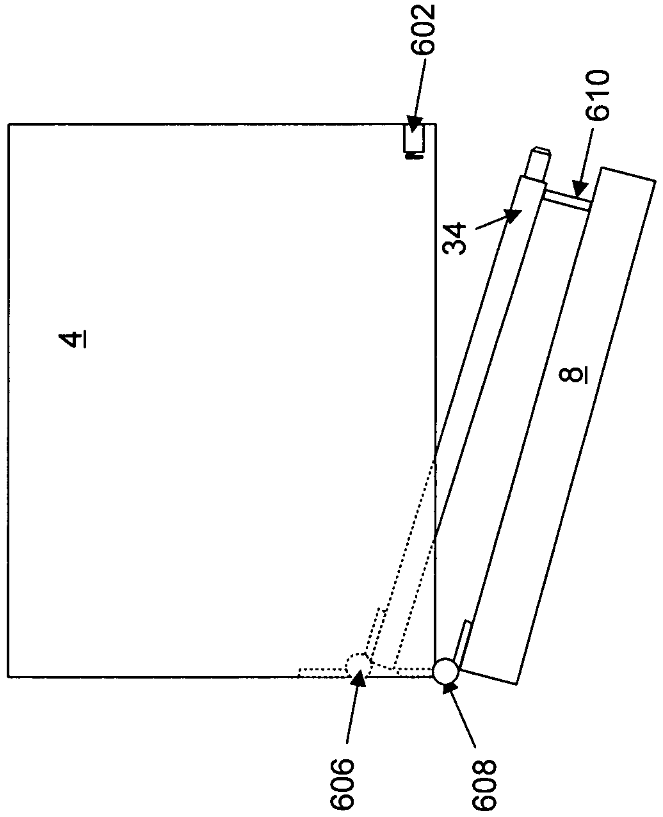
FIGS. 6A and 6B illustrate another embodiment to control access to a gaming machine cabinet.
Figure 6B:
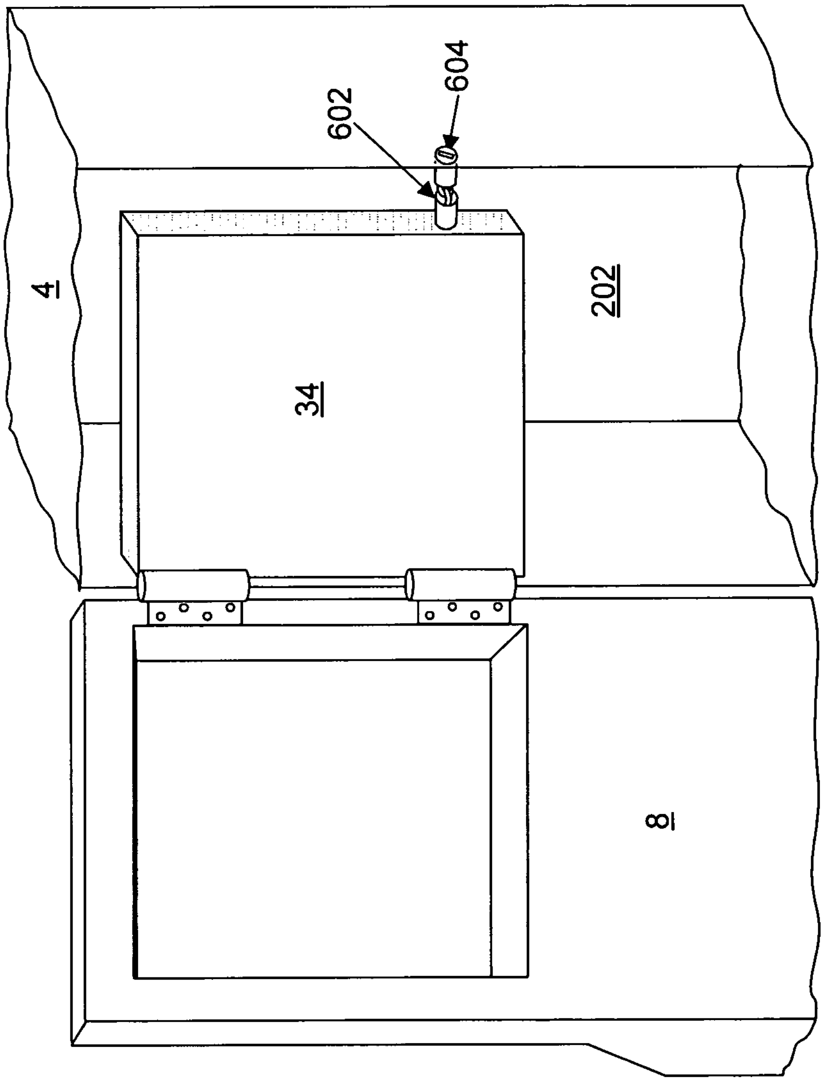

FIGS. 6A and 6B illustrate another embodiment to control access to a gaming machine cabinet. FIG. 6A is a top view illustrating the display 34 connected to the cabinet 4 separate from the main door 8. Thus, a first connector 606 is used to connect the display 34 to the cabinet 4 and a second connector 608 is used to connect the main door 8 to the cabinet 4. The first and second connector 606, 608 may be any connector that will allow the display 34 and door 8 to rotate outwardly from a closed position to an open position for access to the cabinet interior 202, such as a hinge. FIG. 6B illustrates the display 34 securely connected to the cabinet 4 with a latch 602. The latch 602 may be any latch that will securely connect the display to the cabinet such as a hook or plunger. The latch 602 may also be a lock wherein access 604 to release the latch 602 may be accessed from outside the cabinet 4. The display 34 may act as a security barrier to the cabinet interior 202. A user may access the cabinet interior 202 only with the proper key or access code to unlock the lock 604 to release the latch 602.

Since the door 8 and display 34 are not connected together, a third connector 610 may used to couple the display 34 and the main door 8 together when opened or closed. The connector 610 may be any connector that will allow the display 34 and door 8 to move simultaneously, such as a tether, chain, or a ball bearing and chain assembly. Additionally, the connector 610 may be coupled at the top or bottom of the display 34 and main door 8.

Figure 7:
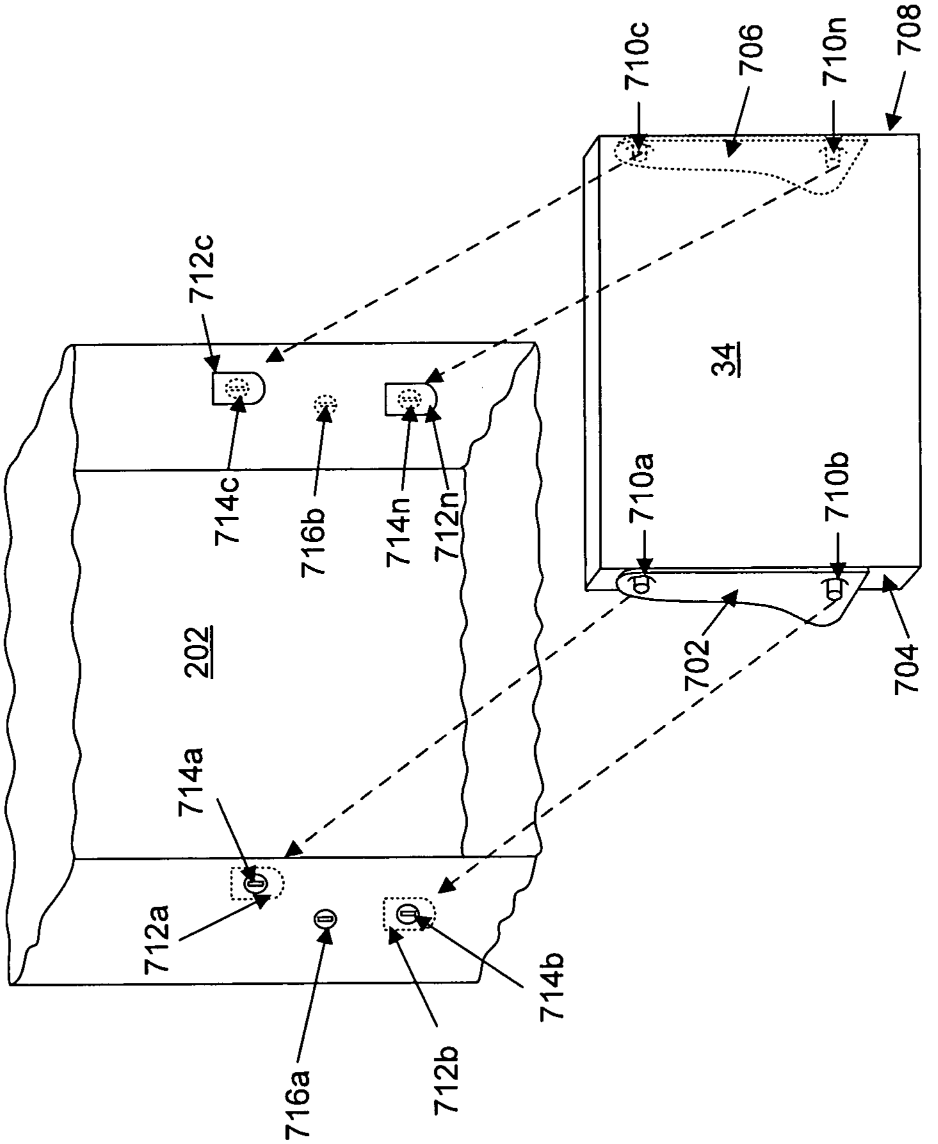
FIG. 7 illustrates an embodiment of a display with locking side brackets.

FIG. 7 illustrates an embodiment of a display with locking side brackets. The display 34 may have a first bracket 702 coupled to the first side 704 of the display 34 and a second bracket 706 coupled to the second side 708 of the display 34. The first bracket 702 and second bracket 706 may have a plurality of pins 710*a*, 710*b*, 710*n* (where n is an integer) extending outwardly from the brackets 702, 706. Each of the plurality of pins 710*a-n* are to be received within a pin receiver 712*a*, 712*b*, 712*c*, 712*n* coupled to the cabinet interior 202 to secure the display 34 to the cabinet 4. Each pin may rest within the pin receiver 712*a-n* to position the display 34 in a closed position.

To lock the display 34 to the cabinet 4 and control access to the cabinet interior 202, some or each of the pin receivers 712*a-n* may be coupled with a lock 714*a*, 714*b*, 714*c*, 714*n*. Alternatively, the display 34 may be locked to the cabinet 4 with lock 716*a*, 716*b* that locks the first bracket 702 and the second bracket 706 to the cabinet 4. Each of the locks 714*a*, 714*b*, 714*c*, 714*n*, and 716*a*, 716*b* may be a key-actuated lock or a combination lock. Access to the locks 714*a*, 714*b*, 714*c*, 714*n*, and 716*a*, 716*b* may be positioned outside the cabinet 4.

To secure access to different areas of the gaming machine cabinet, additional security barriers may be positioned within the cabinet interior to prevent access to those areas. As described above, the display 4 may be used to secure a medium security access area in the cabinet interior 202. To secure and control access to a high security access area, a security barrier may be used and locked to the cabinet. The security barrier may be another door, metal panel, or any other means to prevent unauthorized access to the second area. Additionally, the security barrier may be locked to the cabinet by any means as described above or known in the art. Thus, numerous security barriers may be used to control access to various areas of the cabinet.

While embodiments and applications have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A gaming machine, comprising:

a cabinet having an interior portion;

a gaming machine door coupled to the cabinet;

a display situated between the gaming machine door and the interior portion of the cabinet, the display configured to display a game of chance and having a top, a bottom, a first side, and a second side;

at least one releasable latch coupled to the display top to releasably connect the display to the cabinet;

at least one connector coupled to the display bottom to rotatably couple the display to the cabinet;

at least one coupler having a first end coupled to the display top and a second end coupled to the interior portion of the cabinet, the coupler configured to allow the display to rotate downward about the axis of rotation of the at least one connector and provide access to the interior portion when the at least one releasable latch is in a released position, wherein the at least one releasable latch is configured to release the display from the cabinet when the gaming machine door is in an open position;

a motor coupled to the at least one coupler, the motor configured to move the at least one coupler when the gaming machine door is in the open position; and a lock coupled to the at least one releasable latch to secure the display to the cabinet when the lock is in a locked position and an external force is applied to the display, thereby preventing unauthorized access to the interior portion.

2. The gaming machine of claim 1, wherein the at least one connector is a hinge.

3. The gaming machine of claim 1, wherein the at least one connector further comprises:

a first rail coupled to a first side of the interior portion; and a second rail coupled to a second side of the interior portion;

wherein when the display is configured to slide along the first and second rails such that the display is movable to a lowered position, wherein when the display is in the lowered position, the display prevents unauthorized access to a lower section of the interior portion by blocking the lower section.

4. A gaming machine, comprising:

a cabinet having an interior portion;

a gaming machine door coupled to the cabinet;

a display situated between the gaming machine door and the interior portion, the display configured to display a game of chance and having a top, a bottom, a first side, and a second side;

at least one support bar coupled to a cabinet front to support the display, wherein the at least one support bar is configured to slideably receive the display, wherein the display is configured to slide horizontally along the at least one support bar across the cabinet front to at least partially expose the interior portion of the cabinet, wherein the display is further configured to rotate about a vertical axis when the display is at least partially exposing the interior portion of the cabinet; and a lock coupled to the display and configured to maintain the display in a position where the display substantially blocks access to the interior portion of the cabinet when the lock is in a locked position and an external force is applied to the display.

5. The gaming machine of claim 4, further comprising a means for rotating the display comprising: at least one pivot bar coupled to the at least one support bar and the display.

6. The gaming machine of claim 4, wherein the display is further configured to slide along the display top or display bottom.

7. The gaming machine of claim 4, wherein the interior portion of the gaming machine is completely accessible when the display is slid along and rotated about the at least one support bar to an open position.

8. The gaming machine of claim 6, wherein the display is configured to be substantially parallel to the first side or the second side of the gaming machine when the display is in the open position.

9. A gaming machine, comprising:

a cabinet having an interior portion;

a gaming machine door coupled to the cabinet;

a display situated between the gaming machine door and the interior portion of the cabinet, the display configured to display a game of chance and having a top, a bottom, a first side, and a second side;

at least one releasable latch coupled to the display top to releasably connect the display to the cabinet;

at least one connector coupled to the display bottom to rotatably couple the display to the cabinet;

at least one coupler having a first end coupled to the display top and a second end coupled to the interior portion of the cabinet, the coupler configured to allow the display to rotate downward about the axis of rotation of the at least one connector and provide access to the interior portion when the at least one releasable latch is in a released position, wherein the at least one releasable latch is configured to release the display from the cabinet when the gaming machine door is in an open position;

wherein the at least one connector further comprises:

a first rail coupled to a first side of the interior portion; and a second rail coupled to a second side of the interior portion;

wherein when the display is configured to slide along the first and second rails such that the display is movable to a lowered position, wherein when the display is in the lowered position, the display prevents unauthorized access to a lower section of the interior portion by blocking the lower section;

a lock coupled to the at least one releasable latch to secure the display to the cabinet when the lock is in a locked position and an external force is applied to the display, thereby preventing unauthorized access to the interior portion.

* * * * *